United States Patent
Sata et al.

(10) Patent No.: US 8,448,504 B2
(45) Date of Patent: May 28, 2013

(54) EXHAUST CATALYST TEMPERATURE ESTIMATING APPARATUS AND EXHAUST CATALYST TEMPERATURE ESTIMATION METHOD FOR INTERNAL COMBUSTION ENGINE

(75) Inventors: Kota Sata, Susono (JP); Koichi Ueda, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/393,693

(22) PCT Filed: Oct. 7, 2010

(86) PCT No.: PCT/IB2010/002534
§ 371 (c)(1),
(2), (4) Date: Mar. 1, 2012

(87) PCT Pub. No.: WO2011/055176
PCT Pub. Date: May 12, 2011

(65) Prior Publication Data
US 2012/0204629 A1 Aug. 16, 2012

(30) Foreign Application Priority Data
Nov. 6, 2009 (JP) .................................. 2009-255299

(51) Int. Cl.
*G01M 15/00* (2006.01)
(52) U.S. Cl.
USPC ...................................................... 73/114.75
(58) Field of Classification Search
USPC ......................................................... 73/114.75
See application file for complete search history.

(56) References Cited

U.S. PATENT DOCUMENTS

| | | | | |
|---|---|---|---|---|
| 5,860,277 A | * | 1/1999 | Schnaibel et al. | 60/274 |
| 5,938,715 A | * | 8/1999 | Zhang et al. | 701/109 |
| 6,145,302 A | * | 11/2000 | Zhang et al. | 60/274 |
| 7,343,786 B2 | * | 3/2008 | Pfister | 73/114.39 |
| 8,135,535 B2 | * | 3/2012 | Karnik et al. | 701/102 |

FOREIGN PATENT DOCUMENTS

| | | |
|---|---|---|
| DE | 44 26 020 A1 | 2/1996 |
| DE | 197 36 233 A1 | 2/1999 |
| JP | A-05-248227 | 9/1993 |
| JP | A-2002-366374 | 12/2002 |
| JP | A-2003-254038 | 9/2003 |

OTHER PUBLICATIONS

International Search Report issued in Application No. PCT/IB2010/002534; Dated Dec. 21, 2010.
Written Opinion of the International Searching Authority issued in Application No. PCT/IB2010/002534; Dated Dec. 21, 2010.

* cited by examiner

*Primary Examiner* — Freddie Kirkland, III
(74) *Attorney, Agent, or Firm* — Oliff & Berridge, PLC

(57) ABSTRACT

A exhaust catalyst temperature estimating apparatus is provided for estimating a exhaust catalyst temperature of a exhaust catalyst in which a catalyst is loaded on a support and arranged in an exhaust system of an internal combustion engine. The exhaust catalyst temperature estimating apparatus estimates the exhaust catalyst temperature using a first model formula to calculate a current exhaust catalyst temperature of the exhaust catalyst based on a parameter corresponding to a current exhaust gas status. The first model formula is empirically determined such that a exhaust catalyst temperature that excludes heat generated by a chemical reaction is calculated for the parameter by using the support prior to being loaded with the catalyst, or is a physical formula of the support prior to being loaded with the catalyst such that a exhaust catalyst temperature excludes heat generated by a chemical reaction is calculated for the parameter.

8 Claims, 2 Drawing Sheets

EXHAUST CATALYST TEMPERATURE ESTIMATING APPARATUS AND EXHAUST CATALYST TEMPERATURE ESTIMATION METHOD FOR INTERNAL COMBUSTION ENGINE

BACKGROUND OF THE INVENTION

1. Field of the Invention

The invention relates to an exhaust catalyst temperature estimating apparatus and an exhaust catalyst temperature estimation method for an internal combustion engine.

2. Description of the Related Art

An exhaust catalyst for purifying exhaust gas is arranged in the exhaust system of internal combustion engines. The catalyst loaded in this type of exhaust catalyst has an activation temperature, and is unable to adequately purify exhaust gas if the temperature of the catalyst is equal to or below the activation temperature. As a result, it is necessary to determine whether the catalyst has reached the activation temperature by estimating the exhaust catalyst temperature as a catalyst temperature.

For example, Japanese Patent Application Publication No. 5-248227 (JP-A-5-248227) describes estimating current exhaust catalyst temperature by identifying a model formula for estimating current exhaust catalyst temperature that uses current engine speed, current fuel injection volume and current combustion air-fuel ratio as variables by applying to an actual engine through compliance testing, and then using the model formula to estimate current exhaust catalyst temperature.

By estimating exhaust catalyst temperature as described above, the identified model formula also takes into consideration the generation of heat by unburned fuel and the like contained in the exhaust gas due to a chemical reaction in the exhaust catalyst. However, there is no guarantee that a chemical reaction generating the same amount of heat will occur at all times, even under identical conditions. In addition, if the catalyst deteriorates, the amount of heat generated from the chemical reaction under identical conditions steadily decreases. Thus, even if exhaust catalyst temperature is estimated using a model formula that takes chemical reactions into consideration, the estimated exhaust catalyst temperature may exceed the actual temperature, which may result in incorrectly determining that the catalyst has reached the activation temperature.

SUMMARY OF THE INVENTION

The invention provides an exhaust catalyst temperature estimating apparatus that estimates the exhaust catalyst temperature to determine whether the catalyst is activated, wherein activation of the catalyst based on estimated exhaust catalyst temperature may be more accurately determined, and a exhaust catalyst temperature estimation method.

A first aspect of the invention relates to a exhaust catalyst temperature estimating apparatus for estimating exhaust catalyst temperature of a exhaust catalyst in which a catalyst is loaded on a support and arranged in an exhaust system of an internal combustion engine, wherein: the exhaust catalyst temperature estimating apparatus estimates the exhaust catalyst temperature using a first model formula to calculate a current exhaust catalyst temperature of the exhaust catalyst based on a parameter corresponding to a current exhaust gas status; and the first model formula is empirically determined such that a exhaust catalyst temperature that excludes heat generated by a chemical reaction is calculated for the parameter by using the support prior to being loaded with the catalyst, or is a physical formula of the support prior to being loaded with the catalyst such that a exhaust catalyst temperature excludes heat generated by a chemical reaction is calculated for the parameter.

According to the aspect described above, the estimated exhaust catalyst temperature is hardly ever lower or higher than the actual exhaust catalyst temperature, and incorrect determination of catalyst activation based on the estimated exhaust catalyst temperature can be adequately inhibited. Here, when empirically identifying the first model formula for calculating the exhaust catalyst temperature that is free of heat generated by a chemical reaction, the support prior to being loaded with the catalyst is used since the exhaust catalyst cannot be used due to even slight generation of heat caused by the occurrence of a chemical reaction from the supported catalyst.

In the configuration described above, the exhaust catalyst temperature estimating apparatus may use a second model formula to calculate the current exhaust catalyst temperature of the exhaust catalyst based on a parameter corresponding to a current exhaust gas status, the second model formula may be empirically determined such that a exhaust catalyst temperature that is free of heat generated by a chemical reaction is calculated for the parameter by using the exhaust catalyst supporting the catalyst, or may be a physical formula of the exhaust catalyst supporting the catalyst such that a exhaust catalyst temperature in the presence of heat generated by a chemical reaction is calculated for the parameter, and the exhaust catalyst temperature estimating apparatus may estimate the current exhaust catalyst temperature using the first model formula when a prescribed condition has been satisfied, and may estimate the current exhaust catalyst temperature using the second model formula when the prescribed condition is not satisfied.

According to the configuration described above, a exhaust catalyst temperature can be estimated according to the second model formula based on the presence of heat generated by a chemical reaction in the exhaust catalyst if the prescribed condition is not satisfied, and a exhaust catalyst temperature that more closely approximates the actual exhaust catalyst temperature can be estimated from the exhaust catalyst temperature estimated according to the first model formula based on the absence of heat generated by a chemical reaction in the exhaust catalyst.

In the configuration described above, the prescribed condition may be considered to be satisfied when the exhaust catalyst temperature is lower than a prescribed temperature.

According to the configuration described above, when the prescribed condition is satisfied, the exhaust catalyst temperature is estimated according to the first model formula, and at this time, since the exhaust catalyst temperature is determined to be lower than the prescribed temperature, the exhaust catalyst temperature is comparatively low, the chemical reaction in the exhaust catalyst is inactive and only a small amount of heat is generated, and a exhaust catalyst temperature estimated according to the first model formula based on the absence of heat generated by the chemical reaction in the exhaust catalyst is not much different from the actual exhaust catalyst temperature. In addition, if the prescribed condition is not satisfied, since the exhaust catalyst temperature is judged to be higher than the prescribed temperature, the exhaust catalyst temperature is comparatively high, the chemical reaction in the exhaust catalyst is active resulting in an increase in the amount of heat generated, and a exhaust catalyst temperature that closely approximates the actual exhaust catalyst temperature is estimated according to the second model formula based on the presence of heat generated by the chemical reaction in the exhaust catalyst.

In the configuration described above, the prescribed condition may be considered to be satisfied in a case the elapsed time from completion of engine starting is less than a prescribed time.

According to the configuration described above, when the prescribed condition is satisfied, the exhaust catalyst temperature is estimated according to the first model formula, and at this time, since the elapsed time from completion of engine starting is less than a prescribed time, the exhaust catalyst temperature is comparatively low, the chemical reaction in the exhaust catalyst is inactive and only a small amount of heat is generated, and a exhaust catalyst temperature estimated according to the first model formula based on the absence of heat generated by the chemical reaction in the exhaust catalyst is not much different from the actual exhaust catalyst temperature. In addition, if the prescribed condition is not satisfied, since the elapsed time from completion of engine starting is longer than a prescribed time at this time, the exhaust catalyst temperature is comparatively high, the chemical reaction in the exhaust catalyst is active resulting in an increase in the amount of heat generated, and a exhaust catalyst temperature that closely approximates the actual exhaust catalyst temperature is estimated according to the second model formula based on the presence of heat generated by the chemical reaction in the exhaust catalyst.

In the configuration described above, the prescribed condition may be considered to be satisfied based on the cooling water temperature belong lower than a prescribed water temperature.

According to the configuration described above, when the prescribed condition is satisfied, the exhaust catalyst temperature is estimated according to the first model formula, and at this time, the exhaust catalyst temperature is comparatively low, the chemical reaction in the exhaust catalyst is inactive and only a slight amount of heat is generated, and a exhaust catalyst temperature estimated according to the first model formula based on the absence of heat generated by the chemical reaction in the exhaust catalyst is not much different from the actual exhaust catalyst temperature. In addition, if the prescribed condition is not satisfied, the exhaust catalyst temperature is comparatively high, the chemical reaction in the exhaust catalyst is active resulting in an increase in the amount of heat generated, and a exhaust catalyst temperature that closely approximates the actual exhaust catalyst temperature is estimated according to the second model formula based on the presence of heat generated by the chemical reaction in the exhaust catalyst.

In the configuration described above, an arithmetic processing unit of the exhaust catalyst temperature estimating apparatus not only calculates the current exhaust catalyst temperature using the first model formula or the second model formula, but is also responsible for other arithmetic processing, and the prescribed condition may be made to satisfied more easily when the load of the other arithmetic processing is large as compared with when the load is small.

According to the configuration described above, when the load of the other arithmetic processing in the arithmetic processing unit is large, the prescribed condition is satisfied easily and the exhaust catalyst temperature is estimated according to the first model formula while only requiring a small arithmetic processing load based on the absence of heat generated by the chemical reaction, while when the load of the other arithmetic processing of the arithmetic processing unit is small, the prescribed condition is satisfied with greater difficulty, and a comparatively accurate exhaust catalyst temperature is estimated that requires a large arithmetic processing load according the second model formula based on the presence of heat generated by the chemical reaction.

In a second aspect thereof, the invention relates to a exhaust catalyst temperature estimation method for estimating a exhaust catalyst temperature of a exhaust catalyst in which a catalyst is loaded on a support and which is arranged in an exhaust system of an internal combustion engine. This exhaust catalyst temperature estimation method includes estimating the exhaust catalyst temperature by using a first model formula for calculating current exhaust catalyst temperature of the exhaust catalyst based on a parameter corresponding to current exhaust gas status, wherein: the first model formula is empirically identified such that a exhaust catalyst temperature that is free of heat generated by a chemical reaction is calculated for the parameter by using the support prior to being loaded with the catalyst, or is a physical formula of the support prior to being loaded with the catalyst such that a exhaust catalyst temperature that is free of heat generated by a chemical reaction is calculated for the parameter.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
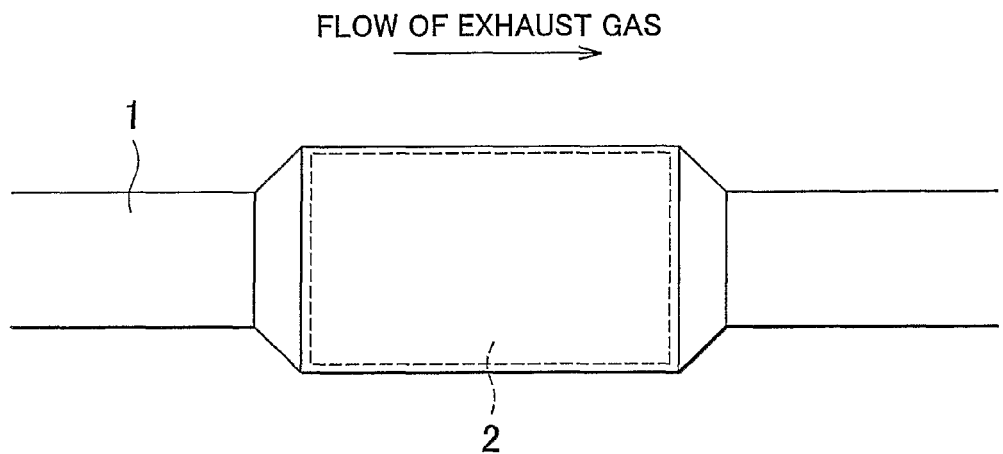
FIG. 1 is a schematic diagram showing an exhaust catalyst in which temperature is estimated using an exhaust catalyst temperature estimating apparatus of an internal combustion engine according to the invention.

FIG. 1 is a schematic diagram showing an exhaust catalyst in which temperature is estimated by an exhaust catalyst temperature estimating apparatus of an internal combustion engine according to the invention. As shown in FIG. 1, an internal combustion engine is provided with an exhaust path 1 of a diesel engine or spark ignition internal combustion engine, and an exhaust catalyst 2 provided in the exhaust path 1 that purifies exhaust gas flowing through the exhaust path 1. The exhaust catalyst 2 can be any suitable exhaust catalyst, such as, for example, a NOx storage-reduction exhaust catalyst that purifies nitrogen oxide (NOx) present in exhaust gas; a three-way exhaust catalyst that simultaneously purifies carbon monoxide (CO), hydrocarbon (HC) and NOx present in exhaust gas; or an exhaust gas oxidation catalyst that mainly purifies CO and HC present in exhaust gas.

A steady-state temperature ($TS_n$) of the exhaust catalyst 2 relative to a current exhaust gas status (exhaust catalyst temperature that converges when the current exhaust gas status has continued for a brief period of time) may be represented by, for example, the following formula (1):

$$TS_n = K*(Ne)^{a}*(TA)^{b}*(AF/14.7)^{c} \quad (1)$$

Here, Ne indicates the current speed of the internal combustion engine (rpm), TA indicates the current fuel injection time of the internal combustion engine (ms), and AF indicates the current combustion air-fuel ratio of the internal combustion engine. The engine speed Ne, fuel injection time TA and combustion air-fuel ratio AF may be used as parameters that indicate the current exhaust gas status that change the steady-state temperature of the exhaust catalyst 2, such as current exhaust gas temperature, current exhaust gas flow rate and current amount of purifying substances contained in the exhaust gas.

For example, the amount of heat absorbed by the exhaust catalyst increases with increasing exhaust gas temperature, the amounts of heat absorbed and radiated by the exhaust catalyst increase with increasing exhaust gas flow rate, and the amount of heat generated by the catalyst increases as the amount of purifying substances contained in the exhaust gas increases if nearly the entire amount thereof is chemically reacted in the exhaust catalyst. In this manner, the current exhaust gas status is the main factor responsible for changing the exhaust catalyst temperature. In addition, the greater the difference between the exhaust catalyst temperature and the ambient air temperature is, the greater the amount of heat released by the exhaust catalyst.

Accordingly, a single combination of engine speed Ne, fuel injection time TA and combustion air-fuel ratio AF corresponds to a single combination of the current exhaust gas temperature, current exhaust gas flow rate and current amount of purifying substances contained in the exhaust gas, and a single steady-state temperature $TS_n$ of the exhaust catalyst 2 exists for each combination of engine speed Ne, fuel injection time TA and combustion air-fuel ratio AF.

Thus, the operating status of the internal combustion engine is adjusted to match various combinations of engine speed Ne, fuel injection time TA and combustion air-fuel ratio AF, and the steady-state temperature $TS_n$ of the exhaust catalyst 2 is measured for each combination, the coefficient K and exponents a, b and c in formula (1) may then be determined by reverse calculation, thereby enabling the formula (1) to be identified for the exhaust catalyst 2.

Although atmospheric temperature is fixed at a constant value (for example, 20° C.) in the compliance experiment, atmospheric temperature TH may also be used as a variable and multiplied by the power of d in formula (1) ($TS_n = K*(Ne)^a*(TA)^b*(AF/14.7)^c*(TH)^d$). In this case, in order to determine exponent d by reverse calculation, it is necessary to change the atmospheric temperature TH with respect to a single operating status of the internal combustion engine and measure each steady-state temperature TS of the exhaust catalyst.

Steady-state temperature $TS_n$ of the exhaust catalyst 2 may then be calculated for any combination of engine speed Ne, fuel injection time TA and combustion air-fuel ratio AF by using the formula (1).

When the steady-state temperature $TS_n$ is calculated, the current exhaust catalyst temperature $T_n$ may be calculated according to the following formula (2):

$$T_n = CR/(216)*TS_n + (216-CR)/216*T_{n-1} \qquad (2)$$

Here, $T_{n-1}$ indicates the previous exhaust catalyst temperature, and CR indicates a weighting coefficient of the previous exhaust catalyst temperature that is set to a value from 1 to 216. In formula (2), if a steady-state temperature $TS_n$ calculated without changing engine operating status, or in other words, while maintaining the same combination of engine speed Ne, fuel injection time TA and combustion air-fuel ratio AF (and maintaining exhaust gas status as a result thereof) is maintained, then the current exhaust catalyst temperature $T_n$ gradually approaches the steady-state temperature $TS_n$.

The resulting estimated exhaust temperature $T_n$ estimated may be used to determine, for example, whether the exhaust catalyst 2 has reached its activation temperature (exhaust catalyst temperature at which the purification rate of the exhaust catalyst 2 is, for example, 70%). In such a case, although the exhaust catalyst temperature Tn estimated based on formula (1) that has been empirically determined using the exhaust catalyst 2 incorporates heat generated by a chemical reaction by which purified substances are purified by the exhaust catalyst 2, this chemical reaction is unstable if the exhaust catalyst 2 has not reached its activation temperature. There is no guarantee that a chemical reaction generates the same amount of heat even under identical conditions, and if the catalyst deteriorates, the amount of heat generated by the chemical reaction steadily decreases under identical conditions.

Figure 2:
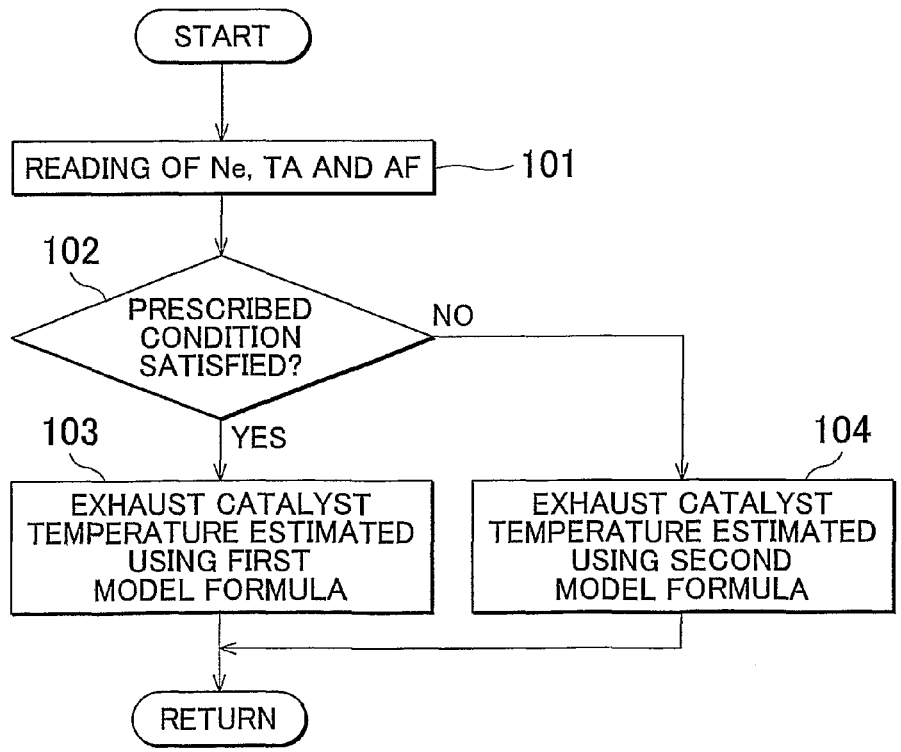
FIG. 2 is a flow chart depicting the temperature estimation process executed by the exhaust catalyst temperature estimating apparatus according to the invention.

Thus, even if the exhaust catalyst temperature is estimated in accordance with model formula (1), the estimated exhaust catalyst temperature may be higher than the actual exhaust catalyst temperature, and it may be incorrectly determined that the catalyst has reached the activation temperature. The exhaust catalyst temperature estimating apparatus of this embodiment reduces the likelihood that an incorrect determination will occur, and the exhaust catalyst temperature is estimated according to the flow chart shown in FIG. 2. The exhaust catalyst temperature estimating apparatus is an electronic control apparatus having an arithmetic processing unit.

First, in Step 101, current engine speed Ne, current fuel injection time TA and current combustion air-fuel ratio AF are read as parameters corresponding to the current exhaust gas status. Next, in Step 102, it is determined whether a prescribed condition has been satisfied. The prescribed condition may be, for example, an elapsed time t from completion of engine starting that is shorter than a prescribed time t1, and if the result of this determination is affirmative (t<t1), the current exhaust catalyst temperature $T_n$ is estimated in Step 103 using the first model formula based on the parameters read in Step 101.

The first model formula is a combination of the following formula (1)' and the above formula (2) in the manner of the above formula (1):

$$TS_n = K1*(Ne)^{a1}*(TA)^{b1}*(AF/14.7)^{c1} \qquad (1)'$$

The exhaust catalyst 2 has a catalyst loaded on the surface of a partition that composes regular holes (square, triangular or hexagonal holes) in the direction of flow of exhaust gas in a monolithic support, in which the holes are formed. Here, formula (1)' is determined for a monolithic support by arranging a monolithic support prior to loading with the catalyst in the exhaust path 1, actually changing the operating status of the internal combustion engine so that a plurality of combinations of engine speed Ne, fuel injection time TA and combustion air-fuel ratio AF are realized, measuring each steady-state temperature TS of the monolithic support for each of the combinations, and coefficient K1 and exponents a1, b1 and c1 may then be determined by reverse calculation.

In this manner, the formula (1)' is empirically determined using the support prior to being loaded with the catalyst so that a steady-state exhaust catalyst temperature (steady-state monolithic support temperature) that does not include the heat generated by a chemical reaction is calculated for the parameters.

The current exhaust catalyst temperature $T_n$ estimated in Step 103 is able to accurately determine whether the catalyst is activated based on an estimated exhaust catalyst temperature because heat generated by a chemical reaction is ignored and the estimated exhaust catalyst temperature is less likely to deviate significantly from the actual exhaust catalyst temperature. In the formula (2), the outside air temperature (fixed value or measured value) may be used for the initial value of the previous exhaust catalyst temperature $T_{n-1}$.

When empirically determining the first model formula for calculating the exhaust catalyst temperature free of heat generated by a chemical reaction, the exhaust catalyst 2 cannot be used due to even slight generation of heat caused by the occurrence of a chemical reaction on the supported catalyst. As a result, in this embodiment, the first model formula is empirically determined by using the support prior to being loaded with the catalyst.

In particular, when the prescribed condition of Step 102 is satisfied, because the elapsed time t from completion of engine starting is less than the prescribed time t1, the exhaust catalyst temperature is comparatively low and, accordingly, the chemical reaction in the exhaust catalyst is inactive so that only a small amount of heat is generated. Thus, the current exhaust catalyst temperature $T_n$ estimated according to the first model formula based on the absence of heat generated by the chemical reaction in the exhaust catalyst is fairly close to the actual exhaust catalyst temperature.

If the exhaust catalyst temperature $T_n$ estimated using the first model formula coincides with the catalyst activation temperature, the actual exhaust catalyst temperature also nearly always coincides with the catalyst activation temperature, and for example, control of increases in exhaust gas temperature that typically worsen fuel consumption (ignition timing delay angle or increased amounts of fuel) may then be avoided.

However, if the elapsed time t from completion of engine starting exceeds the prescribed time t1, the determination of Step 102 is negative and the current exhaust catalyst temperature $T_n$ is estimated in Step 104 using the second model formula based on the parameters read in Step 101. The second model formula combines the following formula (1)" with formula (2) in the manner of formula (1).

$$TS_n = K2 * (Ne)^{a2} * (TA)^{b2} * (AF/14.7)^{c2} \quad (1)''$$

Here, formula (1)" is determined for the actual exhaust catalyst 2 by arranging the exhaust catalyst 2 loaded with the catalyst in the exhaust path 1, changing the operating status of the internal combustion engine so that a plurality of combinations of engine speed Ne, fuel injection time TA and combustion air-fuel ratio AF are realized, measuring each steady-state temperature TS of the exhaust catalyst 2 for each combination, and then determining coefficient K2 and exponents a2, b2 and c2 by reverse calculation.

In this manner, the formula (1)" is empirically determined using the exhaust catalyst 2 loaded with the catalyst so that an exhaust catalyst temperature in which heat generated by a chemical reaction is present may be calculated for the parameters. The formula (1)" is more complex than the formula (1)' because it accounts for the chemical reaction into consideration, or in other words, the exponents a2, b2 and c2 of the formula (1)" are larger than the exponents a1, b1 and c1, respectively, of the formula (1)'. As a result, the arithmetic processing load in calculating the current steady-state exhaust catalyst temperature increases when the second model formula is used instead of the first model formula.

However, if the elapsed time t from completion of engine starting exceeds the prescribed time t1, the exhaust catalyst temperature is comparatively high, and, accordingly, the chemical reaction in the exhaust catalyst is active, so that an increase in the amount of heat generated results. Thus, the exhaust catalyst temperature estimated using the second model formula, to account for the heat generated by the chemical reaction in the exhaust catalyst, closely approximates the actual exhaust catalyst temperature.

Figure 3:
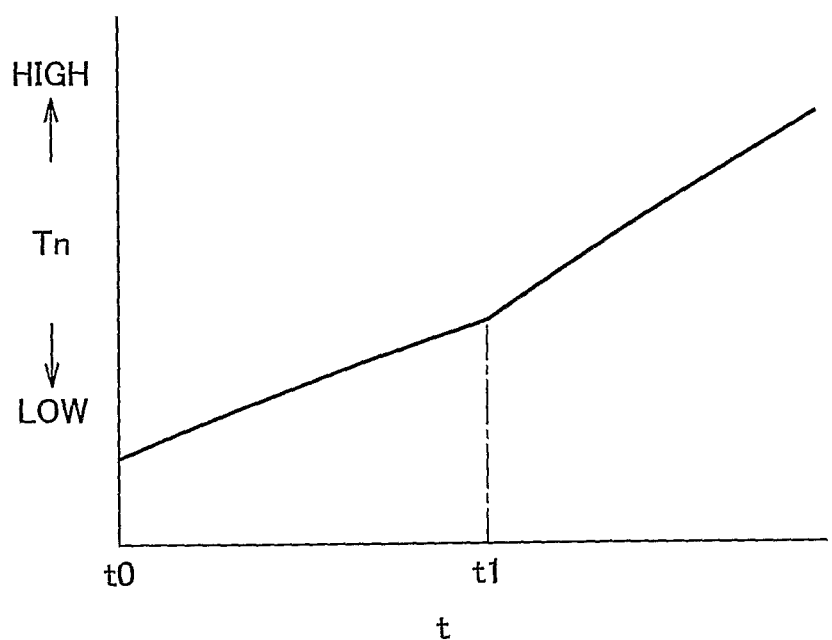
FIG. 3 is a graph showing changes in exhaust catalyst temperature estimated according to the flow chart shown in FIG. 2.

According to this embodiment, as shown in FIG. 3, the exhaust catalyst temperature in the absence of a chemical reaction is estimated using the first model formula ((1)' and (2)) until the prescribed time t1 has elapsed from the completion of engine starting t0, and the exhaust catalyst temperature in the presence of a chemical reaction is estimated using the second model formula ((1)" and (2)) after that time.

In this embodiment, the exhaust catalyst temperature in the absence of a chemical reaction may also continue to be estimated according to the first model formula without determining whether a prescribed condition is satisfied.

In a variation of this embodiment, the prescribed condition of Step 102 may be satisfied when the coolant temperature falls below a prescribed coolant temperature. When the coolant temperature falls below the prescribed coolant temperature, the exhaust catalyst temperature is comparatively low, the chemical reaction in the exhaust catalyst is inactive and only a slight amount of heat is generated. Accordingly, the exhaust catalyst temperature estimated according to the first model formula ((1)' and (2)), based on the absence of the chemical reaction in the exhaust catalyst, is not much different from the actual exhaust catalyst temperature. However, if the coolant temperature is higher than the prescribed coolant temperature, the exhaust catalyst temperature is comparatively high, the chemical reaction in the exhaust catalyst is active, which increases the amount of heat generated. Accordingly, the exhaust catalyst temperature estimated using the second model formula ((1)" and (2)) includes the heat generated by the chemical reaction and thus closely approximates the actual exhaust catalyst temperature. According to this type of prescribed condition, if the coolant temperature is above the prescribed coolant temperature when the engine is restarted, then the exhaust catalyst temperature is estimated using the second model formula. In this case, the coolant temperature, for example, can be used for the initial value of the previous exhaust catalyst temperature $T_{n-1}$ of formula (2).

In addition, the exhaust catalyst temperature may also be determined to be lower than the prescribed temperature in which the prescribed condition of Step 102 is based on another arbitrary condition. At this time as well, the exhaust catalyst temperature is comparatively low, the chemical reaction in the exhaust catalyst is inactive and only a slight amount of heat is generated, and the exhaust catalyst temperature estimated according to the first model formula ((1)' and (2)) based on the absence of heat generated by the chemical reaction in the exhaust catalyst is not much different from the actual exhaust catalyst temperature.

However, in the case the exhaust catalyst temperature estimating apparatus, namely the arithmetic processing unit of the electronic control apparatus, calculates not only the current exhaust catalyst temperature, but is also responsible for other arithmetic processing relating to, for example, control of air-fuel ratio and control of ignition timing, the prescribed condition of Step 102 may be made to be satisfied more easily when the load of the other arithmetic processing in the arithmetic processing unit is large in comparison with when the load is small.

As a result, if the load of other arithmetic processes on the arithmetic processing unit is large, the prescribed condition is satisfied easily and a exhaust catalyst temperature is estimated according to the first model formula ((1)' and (2)) while only requiring a small arithmetic processing load, while when the load of other arithmetic processing of the arithmetic processing unit is small, the prescribed condition is satisfied with greater difficulty, and a comparatively accurate exhaust catalyst temperature is estimated according to the second model formula ((1)" and (2)) based on the presence of heat generated by a chemical reaction that requires a large arithmetic processing load. Thus, the overall arithmetic processing load on the arithmetic processing unit is suppressed to exceed an allowable value.

In addition, if the exhaust catalyst temperature is assumed to not be estimated by continuously using the first model formula a prescribed number of times for the prescribed condition, when the exhaust catalyst temperature has been estimated continuously for a prescribed number of times using the first model formula that only requires a small arithmetic processing load, the exhaust catalyst temperature is then estimated only once using the second model formula based on the presence of heat generated by a chemical reaction that requires a large arithmetic processing load, after which this is repeated. Thus, a comparatively accurate exhaust catalyst temperature may be estimated at regular intervals while reducing the arithmetic processing load on the arithmetic processing unit.

The first model formula is not restricted to formulas (1)' and (2), and the second model formula is not restricted to the above-mentioned formulas (1)" and (2). The first model formula is only required to be that which is empirically identified using the support prior to be loaded with the catalyst so that a exhaust catalyst temperature free of heat generated by a chemical reaction is calculated for parameters corresponding to exhaust gas status, while the second model formula is only required to that which is empirically determined using the exhaust catalyst loaded with the catalyst so that a exhaust catalyst temperature based on the presence of heat generated by a chemical reaction is calculated for parameters corresponding to exhaust gas status.

In addition, parameters corresponding to exhaust gas status in the first model formula and second model formula are not limited to engine speed Ne, fuel injection time TA and combustion air-fuel ratio AF, but rather the temperature of exhaust gas flowing into the exhaust catalyst and intake air volume, for example, may be used instead of engine speed Ne and fuel injection time TA.

However, if heat is not generated by a chemical reaction, the rate of temperature increase dT/dt of the exhaust catalyst temperature may be calculated according to the following formula (3):

$$C1 \cdot dT/dt = Q\text{heat} + Q\text{rad} + Q\text{other1} \quad (3)$$

Here, C1 indicates the heat capacity of a support not loaded with the catalyst. Qheat indicates the amount of heating of the exhaust catalyst, and can be determined as n·TG (gas temperature)*VG (mass flow rate). Qrad is the amount of heat radiated by the exhaust catalyst. In addition, Qother1 is an adjustment term used in this case. In the first model formula, exhaust catalyst temperature in the absence of heat generated by a chemical reaction may also be calculated for parameters corresponding to exhaust gas status as this type of general physical formula.

In contrast, in the case of the presence of heat generated by a chemical reaction, the rate of temperature increase dT/dt of the exhaust catalyst temperature may be calculated according to the following formula (4):

$$C2 \cdot dT/dt = Q\text{st} + Q + \text{heat} + Q\text{rad} + Q\text{other2} \quad (4)$$

Here, C2 indicates the heat capacity of the exhaust catalyst loaded with the catalyst. Qst indicates the heat of the catalytic reaction, and Qother2 is an adjustment term used in this case. In the second model formula, the exhaust catalyst temperature in the presence of heat generated by a chemical reaction may also be calculated for parameters corresponding to exhaust gas status as this type of general physical formula.

The invention claimed is:

1. A exhaust catalyst temperature estimating apparatus for estimating exhaust catalyst temperature of a exhaust catalyst in which a catalyst is loaded on a support and arranged in an exhaust system of an internal combustion engine, the exhaust catalyst temperature estimating apparatus comprising:
   an arithmetic processing unit that estimates the exhaust catalyst temperature using a first model formula to calculate a current exhaust catalyst temperature of the exhaust catalyst based on a parameter corresponding to a current exhaust gas status, wherein
   the first model formula is empirically determined such that a exhaust catalyst temperature that excludes heat generated by a chemical reaction is calculated for the parameter by using the support prior to being loaded with the catalyst, or is a physical formula of the support prior to being loaded with the catalyst such that a exhaust catalyst temperature excludes heat generated by a chemical reaction is calculated for the parameter.

2. The exhaust catalyst temperature estimating apparatus according to claim 1, wherein:
   the arithmetic processing unit uses a second model formula to calculate the current exhaust catalyst temperature of the exhaust catalyst based on a parameter corresponding to a current exhaust gas status;
   the second model formula is empirically determined such that a exhaust catalyst temperature in the presence of heat generated by a chemical reaction is calculated for the parameter by using the exhaust catalyst supporting the catalyst, or is a physical formula of the exhaust catalyst supporting the catalyst such that a exhaust catalyst temperature in the presence of heat generated by a chemical reaction is calculated for the parameter; and
   an arithmetic processing unit estimates the current exhaust catalyst temperature using the first model formula when a prescribed condition is satisfied, and estimates the current exhaust catalyst temperature using the second model formula when the prescribed condition is not satisfied.

3. The exhaust catalyst temperature estimating apparatus according to claim 2, wherein the prescribed condition is satisfied when the exhaust catalyst temperature is below a prescribed catalyst temperature.

4. The exhaust catalyst temperature estimating apparatus according to claim 2, wherein the prescribed condition is satisfied when an elapsed time period from completion of engine starting is less than a prescribed time period.

5. The exhaust catalyst temperature estimating apparatus according to claim 2, wherein the prescribed condition is satisfied when a coolant temperature of the internal combustion engine is below a prescribed coolant temperature.

6. The exhaust catalyst temperature estimating apparatus according to claim 2, wherein:
   the arithmetic processing unit not only calculates the current exhaust catalyst temperature using the first model formula or the second model formula, but is also responsible for other arithmetic processing; and
   the prescribed condition is satisfied more easily when the load of the other arithmetic processing is large as compared with when the load of the other arithmetic processing is small.

7. The exhaust catalyst temperature estimating apparatus according to claim 2, wherein the prescribed condition is satisfied when heat generated by a chemical reaction in the exhaust catalyst is below a prescribed value.

8. A exhaust catalyst temperature estimation method for estimating an exhaust catalyst temperature of a exhaust catalyst in which a catalyst is loaded on a support and arranged in an exhaust system of an internal combustion engine, the method comprising:
estimating the exhaust catalyst temperature using a first model formula to calculate a current exhaust catalyst temperature of the exhaust catalyst based on a parameter corresponding to a current exhaust gas status, wherein:
the first model formula is empirically determined such that a exhaust catalyst temperature that excludes heat generated by a chemical reaction is calculated for the parameter by using the support prior to being loaded with the catalyst, or is a physical formula of the support prior to being loaded with the catalyst such that a exhaust catalyst temperature that excludes heat generated by a chemical reaction is calculated for the parameter.

* * * * *